(12) United States Patent
Hsiung

(10) Patent No.: US 11,775,616 B2
(45) Date of Patent: Oct. 3, 2023

(54) REDUCED FALSE POSITIVE IDENTIFICATION FOR SPECTROSCOPIC QUANTIFICATION

(71) Applicant: VIAVI Solutions Inc., San Jose, CA (US)

(72) Inventor: Changmeng Hsiung, Redwood City, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 50 days.

(21) Appl. No.: 17/301,234

(22) Filed: Mar. 30, 2021

(65) Prior Publication Data

US 2021/0215597 A1 Jul. 15, 2021

Related U.S. Application Data

(63) Continuation of application No. 16/034,901, filed on Jul. 13, 2018, now Pat. No. 11,009,452.
(Continued)

(51) Int. Cl.
*G01N 21/27* (2006.01)
*G06F 18/2411* (2023.01)
(Continued)

(52) U.S. Cl.
CPC ....... *G06F 18/2411* (2023.01); *G01N 21/255* (2013.01); *G01N 21/27* (2013.01);
(Continued)

(58) Field of Classification Search
CPC .................. G01N 21/255; G01N 21/27; G01N 2021/1748; G06K 9/00536; G06K 9/6269; G06K 9/6284; G06K 9/6256
See application file for complete search history.

(56) References Cited

U.S. PATENT DOCUMENTS 4,673,289 A 6/1987 Gaucher
7,133,710 B2 11/2006 Acosta et al.
(Continued)

FOREIGN PATENT DOCUMENTS

CN 101504363 A 8/2009
CN 103364359 A 10/2013
(Continued)

OTHER PUBLICATIONS

Lan Sun et al., Pharmaceutical Raw Material Identification Using Miniature Near-Infrared (MicroNIR) Spectroscopy and Supervised Pattern Recognition, 2016, Applied Spectroscopy, vol. 70(5), pp. 816-825 (Year: 2016).*
(Continued)

*Primary Examiner* — Mischita L Henson
(74) *Attorney, Agent, or Firm* — Harrity & Harrity, LLP

(57) ABSTRACT

A device may receive information identifying results of a spectroscopic measurement performed on an unknown sample. The device may determine a decision boundary for a quantification model based on a configurable parameter, such that a first plurality of training set samples of the quantification model is within the decision boundary and a second plurality of training set samples of the quantification model is not within the decision boundary. The device may determine a distance metric for the spectroscopic measurement performed on the unknown sample relative to the decision boundary. The device may determine a plurality of distance metrics for the second plurality of training set samples of the quantification model relative to the decision boundary. The device may provide information indicating whether the spectroscopic measurement performed on the unknown sample corresponds to the quantification model.

20 Claims, 9 Drawing Sheets

Related U.S. Application Data

(60) Provisional application No. 62/622,641, filed on Jan. 26, 2018.

(51) Int. Cl.
*G06F 18/2433* (2023.01)
*G01N 21/25* (2006.01)
*G01N 21/359* (2014.01)
*G01N 21/17* (2006.01)

(52) U.S. Cl.
CPC ....... *G06F 18/2433* (2023.01); *G01N 21/359* (2013.01); *G01N 2021/1748* (2013.01); *G01N 2201/129* (2013.01); *G06F 2218/12* (2023.01)

(56) References Cited

U.S. PATENT DOCUMENTS

| | | | |
|---|---|---|---|
| 8,189,892 | B2 | 5/2012 | Dimirova et al. |
| 9,435,728 | B2 | 9/2016 | Tsukii et al. |
| 9,824,434 | B2 | 11/2017 | Tzao et al. |
| 10,401,312 | B2 | 9/2019 | Takis et al. |
| 10,489,550 | B2 | 11/2019 | Roder et al. |
| 10,810,408 | B2 | 10/2020 | Hsiung et al. |
| 2003/0028358 | A1 | 2/2003 | Niu et al. |
| 2004/0077950 | A1 | 4/2004 | Marshik-Geurts et al. |
| 2005/0124074 | A1* | 6/2005 | Shelley .............. G01N 21/3563 436/178 |
| 2007/0008523 | A1 | 1/2007 | Kaye et al. |
| 2007/0148697 | A1* | 6/2007 | Delaney .............. B01J 19/0046 435/7.1 |
| 2007/0192035 | A1 | 8/2007 | Schweitzer et al. |
| 2010/0211329 | A1 | 8/2010 | Farquharson et al. |
| 2010/0217537 | A1 | 8/2010 | Neiss et al. |
| 2011/0237446 | A1 | 9/2011 | Treado et al. |
| 2013/0256534 | A1* | 10/2013 | Micheels ........... G01N 21/3563 250/339.07 |
| 2013/0311136 | A1 | 11/2013 | Blonshine et al. |
| 2015/0066377 | A1 | 3/2015 | Parchen et al. |
| 2015/0102216 | A1 | 4/2015 | Roder et al. |
| 2015/0154286 | A1 | 6/2015 | Lightner et al. |
| 2015/0204833 | A1 | 7/2015 | O'Brien et al. |
| 2016/0127405 | A1 | 5/2016 | Kasahara |
| 2017/0059480 | A1 | 3/2017 | Hsiung et al. |
| 2018/0365535 | A1* | 12/2018 | Gesley .................. G06V 20/693 |
| 2019/0234866 | A1 | 8/2019 | Hsiung |
| 2021/0034838 | A1 | 2/2021 | Hsiung et al. |
| 2021/0142038 | A1 | 5/2021 | Hsiung et al. |

FOREIGN PATENT DOCUMENTS

| | | |
|---|---|---|
| CN | 106483083 A | 3/2017 |
| CN | 107561024 A | 1/2018 |
| EP | 1992939 A1 | 11/2008 |
| JP | S6113139 A | 1/1986 |
| JP | H07234941 A | 9/1995 |
| JP | 2005534428 A | 11/2005 |
| JP | 2010527017 A | 8/2010 |
| JP | 2017049246 A | 3/2017 |
| JP | 2018040787 A | 3/2018 |
| JP | 2019522802 A | 8/2019 |
| TW | 1284200 B | 7/2007 |
| TW | 200741192 A | 11/2007 |
| TW | 201504614 A | 2/2015 |
| TW | 201546640 A | 12/2015 |
| TW | 201617030 A | 5/2016 |
| TW | 201709110 A | 3/2017 |
| WO | 2004012586 A2 | 2/2004 |
| WO | 2006056024 A1 | 6/2006 |
| WO | 2011077765 A1 | 6/2011 |
| WO | 2015080001 A1 | 6/2015 |
| WO | 2017127822 A1 | 7/2017 |
| WO | 2017174580 A1 | 10/2017 |

OTHER PUBLICATIONS

Aggarwal C.C., "Chapter 1 An Introduction to Outlier Analysis," Outlier Analysis, Second Edition, Nov. 25, 2016, Springer International Publishing, pp. 1-34. XP055597620.

Dubuisson B., et al., "A Statistical Decision Rule With Incomplete Knowledge About Classes," Pattern Recognition, Jan. 1993, vol. 26 (1), pp. 155-165. XP055568901.

Extended European Search Report for Application No. EP19150264.0, dated Jun. 26, 2019, 12 pages.

Extended European Search Report for Application No. EP19150386.1, dated Jul. 1, 2019, 8 pages.

Hanczar B., et al., "Combination of One-Class Support Vector Machines for Classification with Reject Option," Joint European Conference on Machine Learning and Knowledge Discovery in Databases, Part 1, Lecture Notes in Computer Science, Sep. 2014, vol. 8724, pp. 547-562. XP047297812.

Pasquini C., "Near Infrared Spectroscopy: A Mature Analytical Technique With New Perspectives—A Review," Analytica Chimica Acta, Oct. 2018, vol. 1026, pp. 8-36. XP055597813.

Quan H., et al., "Estimate of standard deviation for a log-transformed variable using arithmetic means and standard deviations," Statistics in Medicine, 2003, vol. 22, pp. 2723-2736.

Schölkopf B., et al., "Estimating the Support of a High-Dimensional Distribution," Neural Computation, Jul. 2001, vol. 13 (7), pp. 1443-1471. Retrieved from Internet:[URL:https://www.mitpressjournals.org/doi/abs/10.1162/089976601750264965], XP055092861.

Sun L., et al., "Pharmaceutical Raw Material Identification Using Miniature Near-Infrared (MicroNIR) Spectroscopy and Supervised Pattern Recognition Using Support Vector Machine," Applied Spectroscopy, Mar. 2016, vol. 70 (5), pp. 816-825. XP055429869.

Tao B., et al., "Implementing Multi-Class Classifiers by One-Class Classification Methods," The 2006 IEEE International Joint Conference on Neural Network, IEEE Operations Center, Piscataway, NJ, USA, Jul. 2006, pp. 327-332. XP010948000.

Tax D.M.J., et al., "Support Vector Domain Description," Pattern Recognition Letters, Nov. 1999, vol. 20 (11-13), pp. 1191-1199. XP004490753.

Haiyan Fu., et al., "A Comprehensive Quality Evaluation Method by FT-NIR Spectroscopy and Chemomeiric: Fine classification and Untargeted Authentication Against Multiple Frauds for Chinese Ganoderma Lucidum," Spectrochim Acta A Mol Biome! Spectrosc, 2017, vol. 182, pp. 17-25.

Jiyu Peng., et al., "Fast Detection of Tobacco Mosaic Virus infected Tobacco Using Laser Induced Breakdown Spectroscopy," Scientific Reports, 2017, vol. 7, pp. 44551.

Smith-Moritz A. M., et al., "Combining Multivariate Analysis and Monosaccharide Composition Modeling to identify Plant Cell Wall Variations by Fourier Transform Near Infrared spectroscopy," Plant Methods, 2011, vol. 7, pp. 26.

Extended European Search Report for Application No. EP21204170.1, dated Apr. 14, 2022, 10 pages.

Lascola et al., "A Piecewise Local Partial Least Squares (PLS) Method for the Quantitative Analysis of Plutonium Nitrate Solutions," Applied Spectroscopy, 2017, vol. 71 (12), pp. 2579-2594.

Maniruzzaman et al., "Accurate Diabetes Risk Stratification Using Machine Learning: Role of Missing Value and Outliers," Journal of Medical Systems, Springer, Apr. 10, 2018, vol. 42 (5), pp. 1-17, XP036507803.

Mertens., "Transformation, Normalization and Batch Effect in the Analysis of Mass Spectrometry Data for Omics Studies," Department of Medical Statistics, Leiden University Medical Center, Jun. 20, 2016, pp. 1-34.

Baassou et al., "An Accurate SVM-based Classification Approach for Hyperspectral Image Classification," International Conference on Geoinformatics, Jun. 2013, pp. 1-7.

Extended European Search Report for Application No. EP23157642.2, dated May 24, 2023, 8 pages.

Eo S.H., et al., "Outlier Detection using Projection Quantile Regression for Mass Spectrometry Data with Low Replication," BMC Research Notes, May 2012, vol. 5 (1), 9 pages, XP021129869.

(56) References Cited

OTHER PUBLICATIONS

Flem B., et al., "In Situ Analysis of Trace Elements in Quartz Using Laser Ablation Inductively Coupled Plasma Mass Spectrometry," In: Quartz: Deposits, Mineralogy and Analytics, Springer Geology, Jan. 2012, pp. 219-236. XP093069925, DOI:10.1007/978-3-642-22161-3_10.

Liu Z.C., et al., "Outlier Detection in Near-infrared Spectroscopic Analysis by Using Monte Carlo Cross-validation," Science in China Series B: Chemistry, Jul. 2008, vol. 51(8), pp. 751-759, XP055574331.

\* cited by examiner

REDUCED FALSE POSITIVE IDENTIFICATION FOR SPECTROSCOPIC QUANTIFICATION

RELATED APPLICATIONS

This application is a continuation of U.S. patent application Ser. No. 16/034,901, filed Jul. 13, 2018, which claims priority under 35 U.S.C. § 119 to U.S. Provisional patent Application No. 62/622,641 filed on Jan. 26, 2018, the contents of which are incorporated herein by reference in their entireties.

BACKGROUND

Raw material identification may be utilized for quality-control of pharmaceutical products. For example, raw material identification may be performed on a medical material to determine whether component ingredients of the medical material correspond to a packaging label associated with the medical material. Similarly, raw material quantification may be performed to determine a concentration of a particular component of a particular sample. For example, raw material quantification may be performed to determine the concentration of an active ingredient in a medicine. Spectroscopy may facilitate non-destructive raw material identification and/or quantification with reduced preparation and data acquisition time relative to other chemometric techniques.

SUMMARY

According to some possible implementations, a device may include one or more memories communicatively coupled to one or more processors. The one or more memories and the one or more processors may be configured to receive information identifying results of a spectroscopic measurement performed on an unknown sample. The one or more memories and the one or more processors may be configured to determine a decision boundary for a quantification model based on a configurable parameter, such that a first plurality of training set samples of the quantification model is within the decision boundary and a second plurality of training set samples of the quantification model is not within the decision boundary. The one or more memories and the one or more processors may be configured to determine a distance metric for the spectroscopic measurement performed on the unknown sample relative to the decision boundary. The one or more memories and the one or more processors may be configured to determine a plurality of distance metrics for the second plurality of training set samples of the quantification model relative to the decision boundary. The one or more memories and the one or more processors may be configured to determine whether the spectroscopic measurement performed on the unknown sample corresponds to the quantification model based on the distance metric for the spectroscopic measurement and the plurality of distance metrics for the second plurality of training set samples. The one or more memories and the one or more processors may be configured to provide information indicating whether the spectroscopic measurement performed on the unknown sample corresponds to the quantification model.

According to some possible implementations, a non-transitory computer-readable medium may store one or more instructions. The one or more instructions, when executed by one or more processors, may cause the one or more processors to obtain a quantification model relating to a particular type of material of interest. The quantification model may be configured for determining a concentration of a particular component in samples of the particular type of the material of interest. The one or more instructions, when executed by the one or more processors, may cause the one or more processors to receive information identifying a result of a particular spectroscopic measurement performed on an unknown sample. The one or more instructions, when executed by the one or more processors, may cause the one or more processors to aggregate other spectroscopic measurements of training set samples of the quantification model into a single class for the quantification model. The one or more instructions, when executed by the one or more processors, may cause the one or more processors to subdivide the other spectroscopic measurements of the training set samples into a first group and a second group. The first group of the other spectroscopic measurements may be within a decision boundary. The second group of the other spectroscopic measurements may not be within the decision boundary The one or more instructions, when executed by the one or more processors, may cause the one or more processors to determine that a metric for the particular spectroscopic measurement performed on the unknown sample relative to corresponding metrics for the second group of the other spectroscopic measurements satisfies a threshold. The one or more instructions, when executed by the one or more processors, may cause the one or more processors to provide information indicating that the unknown sample is not the particular type of the material of interest.

According to some possible implementations, a method may include receiving, by a device, information identifying results of a near infrared (NIR) spectroscopic measurement performed on an unknown sample. The method may include determining, by the device, a decision boundary for a quantification model, wherein the decision boundary divides a single class of the quantification model into a first plurality of training set samples of the quantification model within the decision boundary and a second plurality of training set samples of the quantification model is not within the decision boundary. The method may include determining, by the device, that a particular distance metric for the NIR spectroscopic measurement performed on the unknown sample satisfies a threshold relative to other distance metrics for the second plurality of training set samples. The method may include providing, by the device, information indicating that the NIR spectroscopic measurement performed on the unknown sample does not correspond to the quantification model based on determining that the particular distance metric for the NIR spectroscopic measurement performed on the unknown sample satisfies the threshold relative to the other distance metrics for the second plurality of training set samples.

DETAILED DESCRIPTION

Figure 1A:
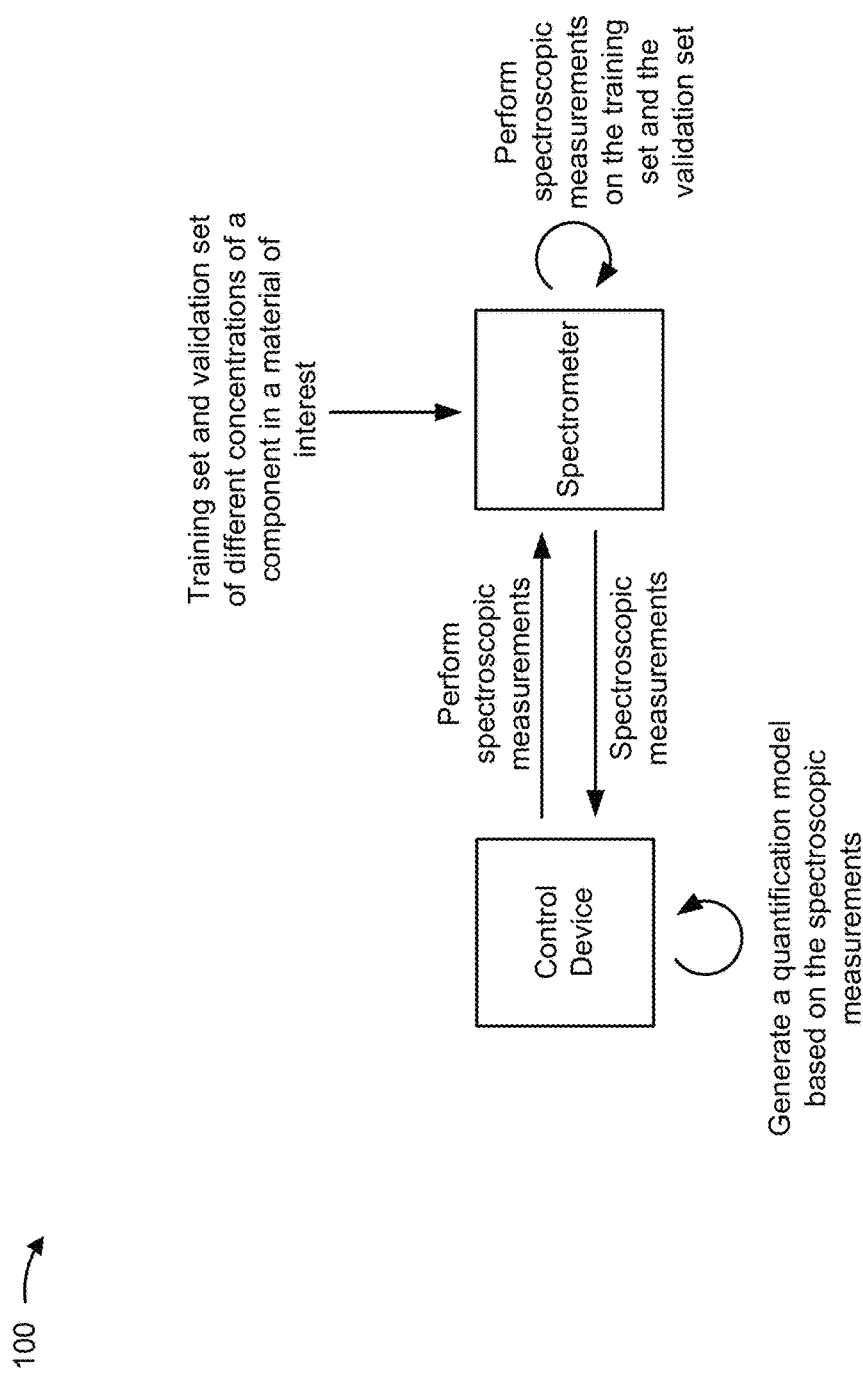
FIGS. 1A and 1B are diagrams of an overview of an example implementation described herein.

The following detailed description of example implementations refers to the accompanying drawings. The same reference numbers in different drawings may identify the same or similar elements.

Raw material identification (RMID) is a technique utilized to identify components (e.g., ingredients) of a particular sample for identification, verification, and/or the like. For example, RMID may be utilized to verify that ingredients in a pharmaceutical material correspond to a set of ingredients identified on a label. Similarly, raw material quantification is a technique utilized to perform a quantitative analysis on a particular sample, such as determining a concentration of a particular component material in the particular sample. A spectrometer may be utilized to perform spectroscopy on a sample (e.g., the pharmaceutical material) to determine components of the sample, concentrations of components of the sample, and/or the like. The spectrometer may determine a set of measurements of the sample and may provide the set of measurements for a spectroscopic determination. A spectroscopic classification technique (e.g., a classifier) may facilitate determination of the components of the sample or concentrations of the components of the sample based on the set of measurements of the sample.

However, some unknown samples, which are to be subject to a spectroscopic quantification, are not actually included in a class of materials that a quantification model is configured to quantify. For example, for a quantification model trained to determine a concentration of a particular type of protein in samples of fish, a user may inadvertently provide a sample of beef for quantification. In this case, a control device may perform a spectroscopic quantification of the sample of beef, and may provide an identification of the sample of beef as having a particular concentration of the particular type of protein. However, because of differences between spectroscopic signatures of beef and fish and proteins thereof, the identification may be inaccurate, and may be termed a false positive identification.

As another example, a quantification model may be trained to quantify relative concentrations of different types of sugar (e.g., glucose, fructose, galactose, and/or the like) and in unknown samples. However, a user of a spectrometer and a control device may inadvertently attempt to classify an unknown sample of sugar based on incorrectly using the spectrometer to perform a measurement. For example, the user may operate the spectrometer at an incorrect distance from the unknown sample, at environmental conditions different from calibration conditions at which spectroscopy was performed to train the quantification model, and/or the like resulting in an incorrectly obtained measurement. In this case, the control device may receive an inaccurate spectrum for the unknown sample resulting in a false positive identification of the unknown sample as having a first type of sugar at a first concentration, when the unknown sample actually includes a second type of sugar at a second concentration.

Some implementations, described herein, may use a single class support vector machine (SC-SVM) technique to reduce a likelihood of false positive identification in spectroscopic quantification. For example, a control device that receives a spectroscopic measurement of an unknown sample may determine whether the spectroscopic measurement of the unknown sample corresponds to a class of materials that a spectroscopic model is configured to quantify. In some implementations, the control device may determine that the unknown sample is not associated with the class of materials that the spectroscopic model is configured to quantify, and may provide information indicating that the unknown sample is not associated with the class of materials, thereby avoiding a false positive identification of the unknown sample. Alternatively, based on determining that the unknown sample is associated with the class of materials that the spectroscopic model is configured to quantify, the control device may analyze a spectrum of the unknown sample to provide a spectroscopic determination, such as of a concentration, a classification, and/or the like. Furthermore, the control device may utilize confidence metrics, such as probability estimates, decision values, and/or the like to filter out false positive identifications.

In this way, an accuracy of spectroscopy is improved relative to spectroscopy performed without identification of potential error samples (e.g., samples associated with a class of materials for which a spectroscopic model is not configured or samples for which a spectroscopic measurement is incorrectly obtained) and/or confidence metrics. Moreover, a determination of whether a material is associated with a class for which a spectroscopic model is configured may be used when generating a quantification model based on a training set of known spectroscopic samples. For example, a control device may determine that a sample, of the training set, is not of a type corresponding to the rest of the training set (e.g., based on human error resulting in an incorrect sample being introduced into the training set), and may determine not to include data regarding the sample when generating a quantification model. In this way, the control device improves an accuracy of quantification models for spectroscopy.

Figure 1B:
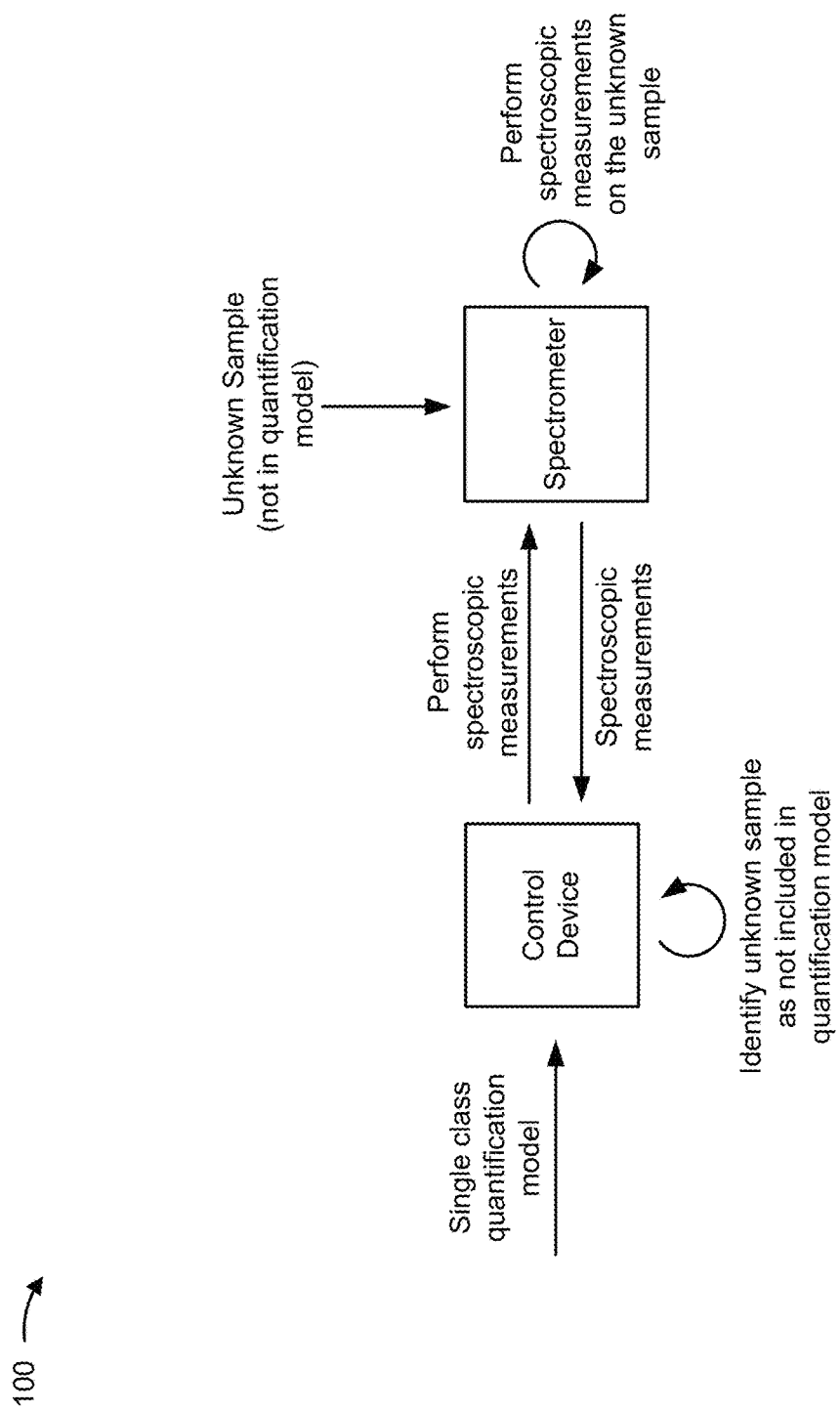

FIGS. 1A and 1B are diagrams of an overview of an example implementation 100 described herein. As shown in FIG. 1A, example implementation 100 may include a control device and a spectrometer.

As further shown in FIG. 1A, the control device may cause the spectrometer to perform a set of spectroscopic measurements on a training set and a validation set (e.g., a set of known samples utilized for training and validation of a classification model). The training set and the validation set may be selected to include a threshold quantity of samples for a component for which a quantification model is to be trained. Materials, in which the component may occur and which may be used to train the quantification model, may be termed materials of interest. In this case, the training set and the validation set may include, for example, a first group of samples representing a first concentration of a material of interest, a second group of samples representing a second concentration of the material of interest, and/or the like to enable training of a quantification model to identify concentrations of the material of interest in unknown samples.

As further shown in FIG. 1A, the spectrometer may perform the set of spectroscopic measurements on the training set and the validation set based on receiving an instruction from the control device. For example, the spectrometer may determine a spectrum for each sample of the training set and the validation set to enable the control device to generate a set of classes for classifying an unknown sample as one of the materials of interest for the quantification model.

The spectrometer may provide the set of spectroscopic measurements to the control device. The control device may generate a quantification model using a particular determination technique and based on the set of spectroscopic measurements. For example, the control device may generate a quantification model using a support vector machine (SVM) technique (e.g., a machine learning technique for information determination), such as a single class SVM (SC-SVM) technique. The quantification model may include information associated with assigning a particular spectrum to a particular concentration of a component of a material of interest (e.g., a particular level of concentration of the component in the material of interest). In this way, a control device can provide information identifying a concentration of a component in an unknown sample based on assigning a spectrum of the unknown sample to a particular class of concentration of the quantification model corresponding to a particular concentration.

As shown in FIG. 1B, the control device may receive the quantification model (e.g., from storage, from another control device that generated the quantification model, and/or the like). The control device may cause a spectrometer to perform a set of spectroscopic measurements on an unknown sample (e.g., an unknown sample for which classification or quantification is to be performed). The spectrometer may perform the set of spectroscopic measurements based on receiving an instruction from the control device. For example, the spectrometer may determine a spectrum for the unknown sample. The spectrometer may provide the set of spectroscopic measurements to the control device. The control device may attempt to quantify the unknown sample based on the quantification model (e.g., classify the unknown sample into a particular class associated with a particular concentration or a particular quantity of a particular component in the unknown sample). For example, the control device may attempt to determine a particular concentration of ibuprofen within an unknown sample (e.g., of a pill), a particular quantity of units of glucose within an unknown sample (e.g., of a sugar-based product), and/or the like.

With regard to FIG. 1B, the control device may attempt to determine whether the unknown sample corresponds to the quantification model. For example, the control device may determine a confidence metric corresponding to a likelihood that the unknown sample belongs to the material of interest (e.g., in any concentration of a set of concentrations for which the quantification model is configured using the training set and the validation set). As an example, for a quantification model configured to identify concentrations of ibuprofen within samples of ibuprofen pills, the control device may determine whether the unknown sample is an ibuprofen pill (rather than another type of pill, such as an acetaminophen pill, an acetylsalicylic acid pill, and/or the like. As another example, for a quantification model configured to identify concentrations of salt in a fish meat, the control device may determine whether the unknown sample is fish meat (rather than chicken, beef, pork, and/or the like).

In this case, based on the control device determining that the confidence metric, such as a probability estimate, a decision value output of a support vector machine, and/or the like, satisfies a threshold (e.g., a standard deviation threshold as described herein), the control device may determine that the unknown sample is not a material of interest (e.g., which may correspond to the unknown sample being a different material, a spectroscopic measurement of the unknown sample being incorrectly performed, and/or the like). In this case, the control device may report that the unknown sample cannot be accurately quantified using the quantification model, thereby reducing a likelihood that the unknown sample is subject to a false positive identification of the unknown sample as belonging to a particular concentration of a component in the material of interest.

In this way, the control device enables spectroscopy for an unknown sample with improved accuracy relative to other quantification models based on reducing a likelihood of reporting a false positive identification of the unknown sample as being a particular concentration of a component in the material of interest.

As indicated above, FIGS. 1A and 1B are provided merely as an example. Other examples are possible and may differ from what was described with regard to FIGS. 1A and 1B.

Figure 2:
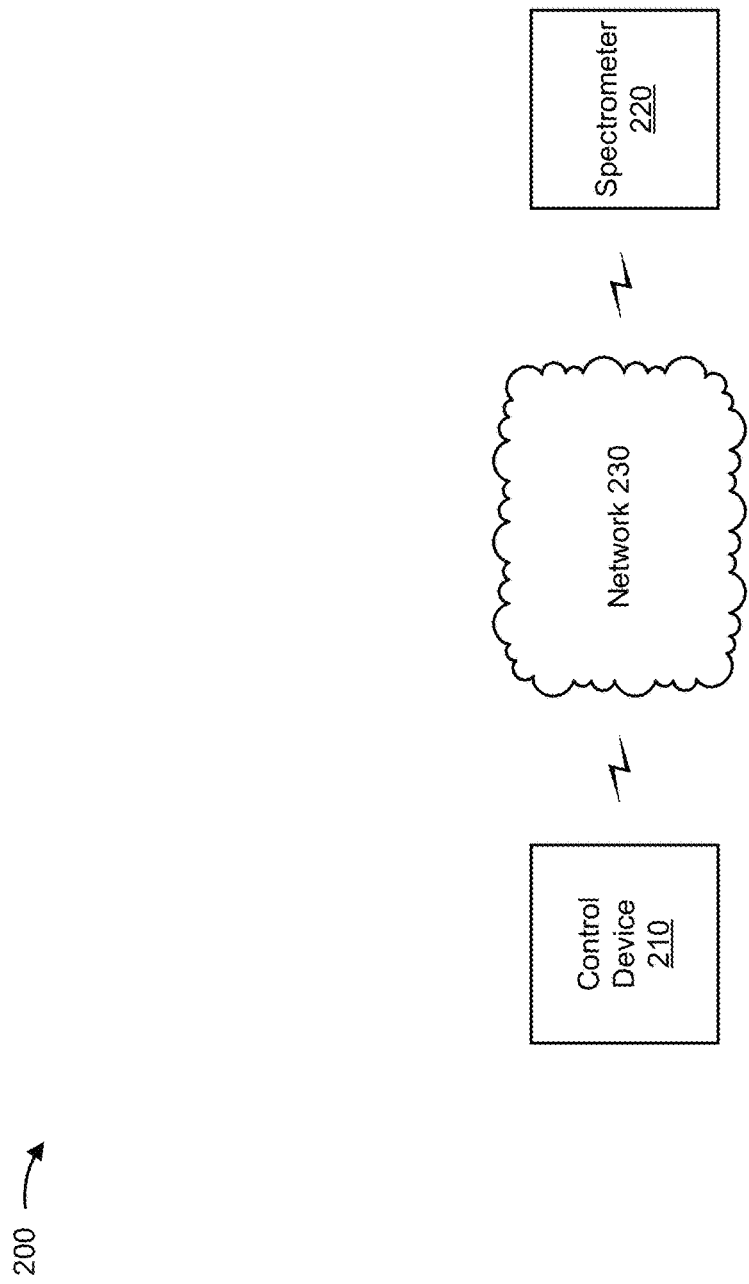
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a control device 210, a spectrometer 220, and a network 230. Devices of environment 200 may interconnect via wired connections, wireless connections, or a combination of wired and wireless connections.

Control device 210 includes one or more devices capable of storing, processing, and/or routing information associated with spectroscopic quantification. For example, control device 210 may include a server, a computer, a wearable device, a cloud computing device, and/or the like that generates a quantification model based on a set of measurements of a training set, validates the quantification model based on a set of measurements of a validation set, and/or utilizes the quantification model to perform spectroscopic quantification based on a set of measurements of an unknown set. In some implementations, control device 210 may utilize a machine learning technique to determine whether a spectroscopic measurement of an unknown sample is to be classified as not corresponding to a material of interest for the quantification model, as described herein. In some implementations, control device 210 may be associated with a particular spectrometer 220. In some implementations, control device 210 may be associated with multiple spectrometers 220. In some implementations, control device 210 may receive information from and/or transmit information to another device in environment 200, such as spectrometer 220.

Spectrometer 220 includes one or more devices capable of performing a spectroscopic measurement on a sample. For example, spectrometer 220 may include a spectrometer device that performs spectroscopy (e.g., vibrational spectroscopy, such as a near infrared (NIR) spectrometer, a mid-infrared spectroscopy (mid-IR), Raman spectroscopy, and/or the like). In some implementations, spectrometer 220 may be incorporated into a wearable device, such as a wearable spectrometer and/or the like. In some implementations, spectrometer 220 may receive information from and/or transmit information to another device in environment 200, such as control device 210.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although control device 210 and spectrometer 220 are described, herein, as being two separate devices, control device 210 and spectrometer 220 may be implemented within a single device. Additionally, or alternatively, a set of devices (e.g., one or more devices) of environment 200 may perform one or more functions described as being performed by another set of devices of environment 200.

Figure 3:
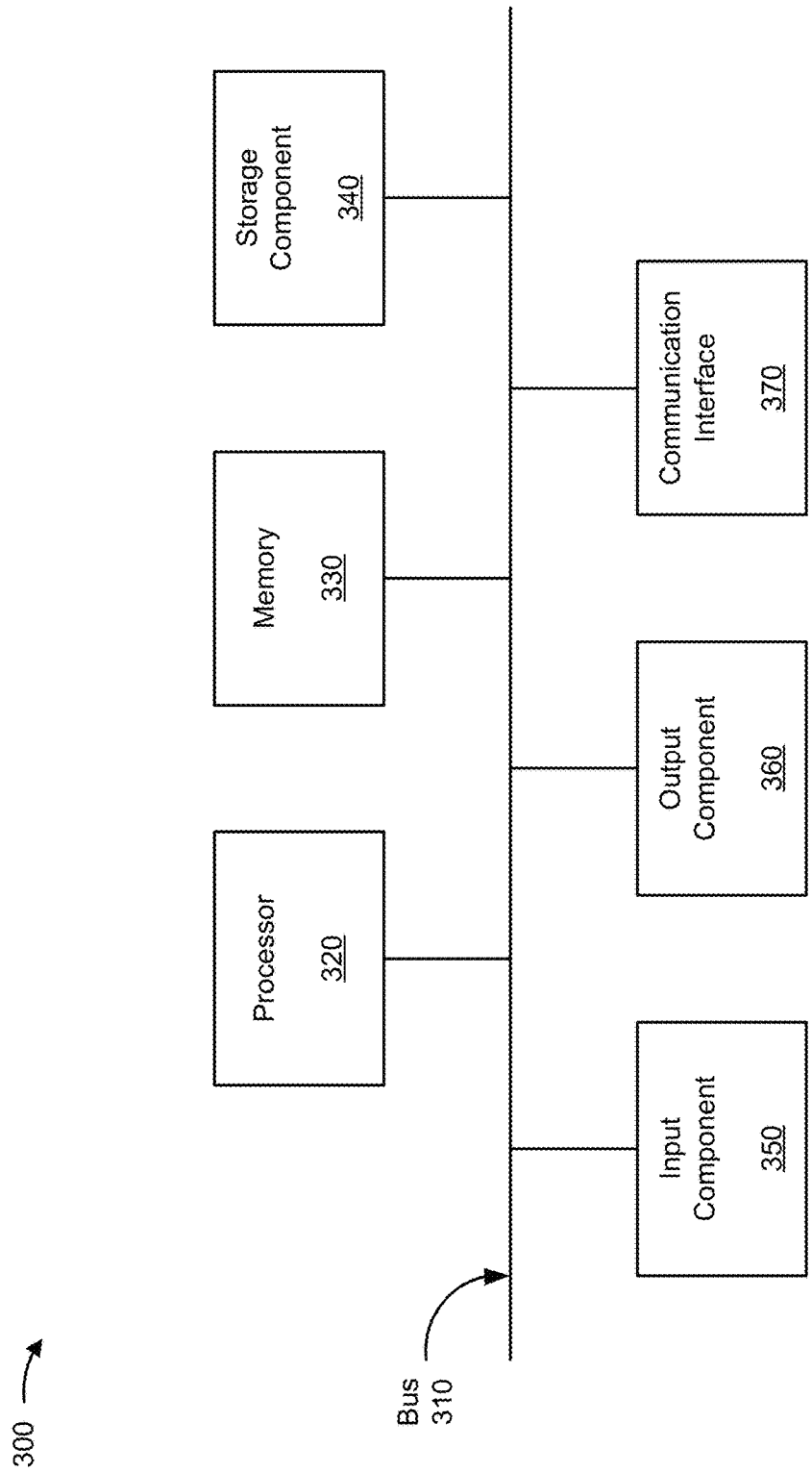
FIG. 3 is a diagram of example components of one or more devices of FIG. 2.

FIG. 3 is a diagram of example components of a device 300. Device 300 may correspond to control device 210 and/or spectrometer 220. In some implementations, control device 210 and/or spectrometer 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
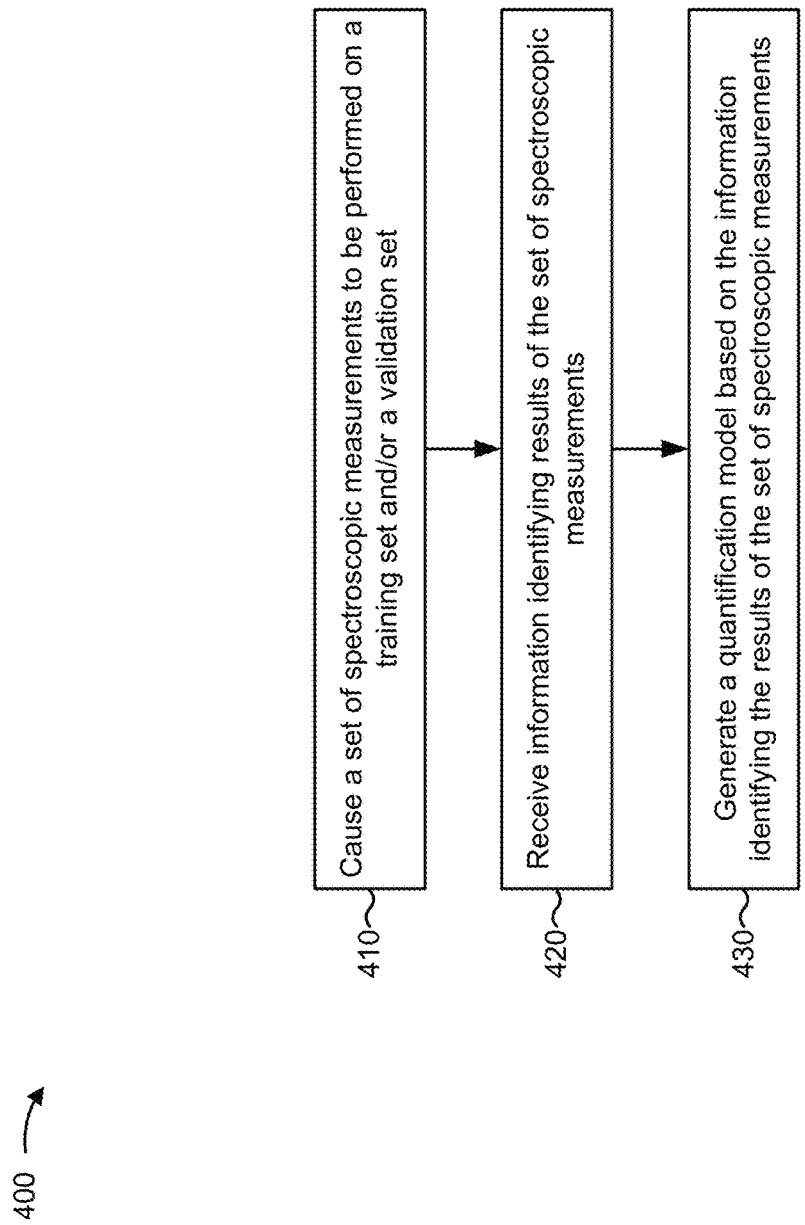
FIG. 4 is a flow chart of an example process for generating a quantification model for spectroscopic quantification.

FIG. 4 is a flow chart of an example process 400 for generating a quantification model for spectroscopic quantification. In some implementations, one or more process blocks of FIG. 4 may be performed by control device 210. In some implementations, one or more process blocks of FIG. 4 may be performed by another device or a group of devices separate from or including control device 210, such as spectrometer 220.

As shown in FIG. 4, process 400 may include causing a set of spectroscopic measurements to be performed on a training set and/or a validation set (block 410). For example, control device 210 may cause (e.g., using processor 320, communication interface 370, and/or the like) spectrometer 220 to perform a set of spectroscopic measurements on a training set and/or a validation set of samples to determine a spectrum for each sample of the training set and/or the validation set. The training set may refer to a set of samples of one or more known materials with a set of concentrations of a component, which are utilized to generate a quantification model for the component. Similarly, the validation set may refer to a set of samples of one or more known materials with a set of concentrations of the component, which are utilized to validate accuracy of the quantification model. For example, the training set and/or the validation set may include one or more versions of a particular material (e.g., one or more versions manufactured by different manufacturers to control for manufacturing differences) in a set of different concentrations.

In some implementations, the training set and/or the validation set may be selected based on an expected set of materials of interest for which spectroscopic quantification is to be performed using the quantification model. For example, when spectroscopic quantification is expected to be performed for a pharmaceutical material to determine a concentration of a particular component of the pharmaceutical material, the training set and/or the validation set may include a set of samples of the particular component in a set of different possible concentrations in a set of pharmaceutical materials that are to be tested for presence of the particular component.

In some implementations, the training set and/or the validation set may be selected to include a particular quantity of samples for each concentration of a material. For example, the training set and/or the validation set may be selected to include multiple samples (e.g., 5 samples, 10 samples, 15 samples, 50 samples, etc.) of a particular concentration. In this way, control device 210 can be provided with a threshold quantity of spectra associated with a particular type of material, thereby facilitating generation and/or validation of a class (e.g., a group of samples corresponding to a particular concentration of the component), for a quantification model, to which unknown samples can be accurately assigned (e.g., based on unknown samples having the particular concentration of the component).

In some implementations, control device 210 may cause multiple spectrometers 220 to perform the set of spectroscopic measurements to account for one or more physical conditions. For example, control device 210 may cause a first spectrometer 220 and a second spectrometer 220 to perform a set of vibrational spectroscopic measurements using NIR spectroscopy. Additionally, or alternatively, control device 210 may cause the set of spectroscopic measurements to be performed at multiple times, in multiple locations, under multiple different laboratory conditions, and/or the like. In this way, control device 210 reduces a likelihood that a spectroscopic measurement is inaccurate as a result of a physical condition relative to causing the set of spectroscopic measurements to be performed by a single spectrometer 220.

In this way, control device 210 causes the set of spectroscopic measurements to be performed on the training set and/or the validation set).

As further shown in FIG. 4, process 400 may include receiving information identifying results of the set of spectroscopic measurements (block 420). For example, control device 210 may receive (e.g., using processor 320, communication interface 370, and/or the like) information identifying the results of the set of spectroscopic measurements. In some implementations, control device 210 may receive information identifying a set of spectra corresponding to samples of the training set and/or the validation set. For example, control device 210 may receive information identifying a particular spectrum, which was observed when spectrometer 220 performed spectroscopy on the training set. In some implementations, control device 210 may receive information identifying spectra for the training set samples and the validation set samples concurrently. In some implementations, control device 210 may receive information identifying spectra for the training set samples, may generate a quantification model, and may receive information identifying spectra for the validation set samples after generating the quantification model to enable testing of the quantification model.

In some implementations, control device 210 may receive the information identifying the results of the set of spectroscopic measurements from multiple spectrometers 220. For example, control device 210 may control for physical conditions, such as a difference between the multiple spectrometers 220, a potential difference in a lab condition, and/or the like, by receiving spectroscopic measurements performed by multiple spectrometers 220, performed at multiple different times, performed at multiple different locations, and/or the like.

In some implementations, control device 210 may remove one or more spectra from utilization in generating the quantification model. For example, control device 210 may perform spectroscopic quantification and may determine that a spectrum does not correspond to a type of material for which the quantification model is configured to quantify, and may determine that a sample corresponding to the spectrum was inadvertently a material that is not of interest (e.g., based on human error in correctly performing spectroscopy, errors in the information identifying the spectra of the training set, and/or the like). In this case, control device 210 may determine to remove the spectrum from the training set. In this way, control device 210 may improve an accuracy of quantification models by reducing a likelihood that a quantification model is generated using incorrect or inaccurate information regarding a training set or validation set.

In this way, control device 210 receives information identifying results of the set of spectroscopic measurements.

As further shown in FIG. 4, process 400 may include generating a quantification model based on the information identifying the results of the set of spectroscopic measurements (block 430). For example, control device 210 may generate (e.g., using processor 320, memory 330, storage component 340, and/or the like) a quantification model associated with an SVM classifier technique based on the information identifying the results of the set of spectroscopic measurements.

SVM may refer to a supervised learning model that performs pattern recognition and uses confidence metrics for quantification. In some implementations, control device 210 may utilize a particular type of kernel function to determine a similarity of two or more inputs (e.g., spectra) when generating a quantification model using the SVM technique. For example, control device 210 may utilize a radial basis function (RBF) (e.g., termed SVM-rbf) type of kernel function, which may be represented as $k(x,y)=\exp(-\|x-y\|^2)$ for spectra x and y; a linear function (e.g., termed SVM-linear and termed hier-SVM-linear when utilized for a multi-stage determination technique) type of kernel function, which may be represented as $k(x,y)=(\,x \cdot y)$, a sigmoid function type of kernel function; a polynomial function type of kernel function; an exponential function type of kernel function; and/or the like. In some implementations, control device 210 may generate the quantification model using a single class SVM (SC-SVM) classifier technique. For example, control device 210 may aggregate multiple classes corresponding to multiple concentrations of a component in the training set to generate a single class representing the quantification model. In this case, control device 210 may utilize a confidence metric to determine a likelihood that an unknown sample is of a type that the quantification model is configured to analyze, as described herein.

In some implementations, control device 210 may utilize a particular type of confidence metric for SVM, such as a probability value based SVM (e.g., determination based on determining a probability that a sample is a member of a class (of concentration) of a set of classes (of possible concentrations)), a decision value based SVM (e.g., determination utilizing a decision function to vote for a class, of a set of classes, as being the class of which the sample is a member), and/or the like. For example, during use of the quantification model with decision value based SVM, control device 210 may determine whether an unknown sample is located within a boundary of a constituent class (e.g., a particular quantity or concentration of a component of the unknown sample) based on a plotting of a spectrum of the unknown sample, and may assign the sample to a class based on whether the unknown sample is located within the boundary of the constituent class. In this way, control device 210 may determine whether to assign an unknown spectrum to a particular class for quantification.

Although some implementations, described herein, are described in terms of a particular set of machine learning techniques, other techniques are possible for determining information regarding an unknown spectrum, such as a classification of the material and/or the like.

In some implementations, control device 210 may select the particular classifier that is to be utilized for generating the quantification model from a set of quantification techniques. For example, control device 210 may generate multiple quantification models corresponding to multiple classifiers and may test the multiple quantification models, such as by determining a transferability of each model (e.g., an extent to which a quantification model generated based on spectroscopic measurements performed on a first spectrometer 220 is accurate when applied to spectroscopic measurements performed on a second spectrometer 220), a large-scale determination accuracy (e.g., an accuracy with which a quantification model can be utilized to concurrently identify concentrations for a quantity of samples that satisfy a threshold), and/or the like. In this case, control device 210 may select a classifier, such as the SVM classifier (e.g., a hier-SVM-linear classifier, an SC-SVM classifier, and/or the like), based on determining that the classifier is associated with superior transferability and/or large-scale determination accuracy relative to other classifiers.

In some implementations, control device 210 may generate the quantification model based on information identifying samples of the training set. For example, control device 210 may utilize the information identifying the types or concentrations of materials represented by samples of the training set to identify classes of spectra with types or concentrations of materials. In some implementations, control device 210 may train the quantification model when generating the quantification model. For example, control device 210 may cause the quantification model to be trained using a portion of the set of spectroscopic measurements (e.g., measurements relating to the training set). Additionally, or alternatively, control device 210 may perform an assessment of the quantification model. For example, control device 210 may validate the quantification model (e.g., for predictive strength) utilizing another portion of the set of spectroscopic measurements (e.g., the validation set).

In some implementations, control device 210 may validate the quantification model using a multi-stage determination technique. For example, for in-situ local modeling based quantification, control device 210 may determine that a quantification model is accurate when utilized in association with one or more local quantification models. In this way, control device 210 ensures that the quantification model is generated with a threshold accuracy prior to providing the quantification model for utilization, such as by control device 210, by other control devices 210 associated with other spectrometers 220, and/or the like.

In some implementations, control device 210 may provide the quantification model to other control devices 210 associated with other spectrometers 220 after generating the quantification model. For example, a first control device 210 may generate the quantification model and may provide the quantification model to a second control device 210 for utilization. In this case, for in-situ local modeling based quantification, the second control device 210 may store the quantification model (e.g., a global quantification model), and may utilize the quantification model in generating one or more in-situ local quantification models for determining a concentration of a component of a material in one or more samples of an unknown set. Additionally, or alternatively, control device 210 may store the quantification model for utilization by control device 210 in performing quantification, in generating one or more local quantification models (e.g., for in-situ local modeling based quantification), and/or the like. In this way, control device 210 provides the quantification model for utilization in spectroscopic quantification of unknown samples.

In this way, control device 210 generates the quantification model based on the information identifying the results of the set of spectroscopic measurements.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
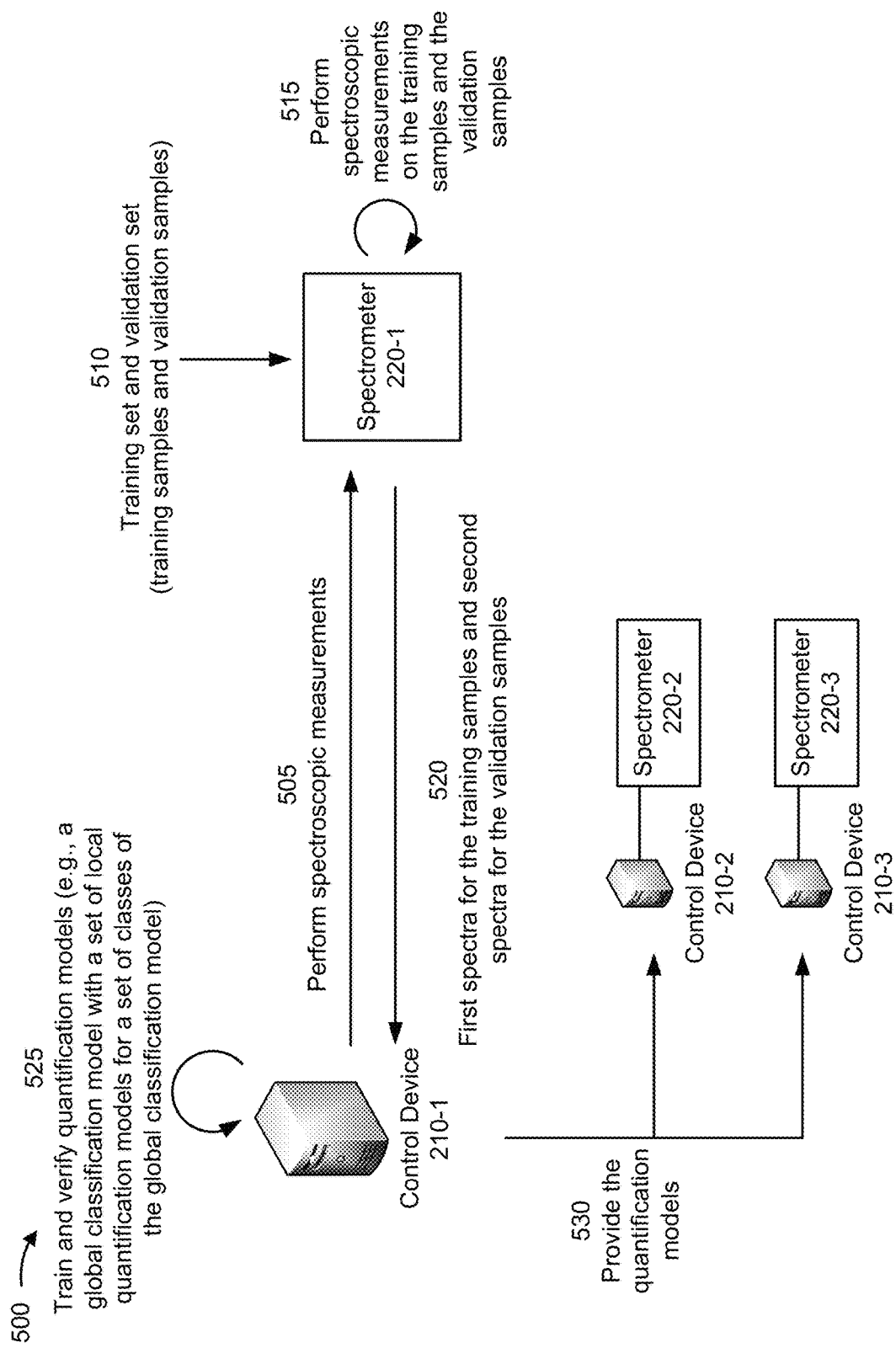
FIG. 5 is a diagram of an example implementation relating to the example process shown in FIG. 4.

FIG. 5 is a diagram of an example implementation 500 relating to example process 400 shown in FIG. 4. FIG. 5 shows an example of generating a quantification model.

As shown in FIG. 5, and by reference number 505, control device 210-1 transmits information to spectrometer 220-1 to instruct spectrometer 220-1 to perform a set of spectroscopic measurements on training set and validation set 510. Assume that training set and validation set 510 includes a first set of training samples (e.g., measurements of which are utilized for training a quantification model) and a second set of validation samples (e.g., measurements of which are utilized for validating accuracy of the quantification model). As shown by reference number 515, spectrometer 220-1 performs the set of spectroscopic measurements based on receiving the instruction. As shown by reference number 520, control device 210-1 receives a first set of spectra for the training samples and a second set of spectra for the validation samples. In this case, the training samples and the validation samples may include samples of multiple concentrations of a component in a group of materials of interest for quantification. For example, control device 210-1 may receive spectra relating to generating a global model (e.g., a global classification model or quantification model) to identify a type of meat using the global model and an in-situ local modeling technique (to generate a local model, such as a local classification model or quantification model), and to quantifying a concentration of a particular protein in the type of meat. In this case, control device 210-1 may be configured to generate multiple local quantification models (e.g., a first quantification model for determining the concentration of the particular protein in a first type of meat identified using in-situ local modeling, a second quantification model for determining the concentration of the particular protein in a second type of meat identified using in-situ local modeling, and/or the like). Assume that control device 210-1 stores information identifying each sample of training set and validation set 510.

With regard to FIG. 5, assume that control device 210-1 has selected to utilize a hier-SVM-linear classifier for generating a classification model, and an SC-SVM classifier for the multiple quantification models. As shown by reference number 525, control device 210-1 trains a global classification model using the hier-SVM-linear classifier and the first set of spectra and verifies the global classification model using the hier-SVM-linear classifier and the second set of spectra. Further, control device 210-1 trains and verifies multiple local quantification models (e.g., a local quantification model corresponding to each class of the global classification model and/or each class of a local classification model generated based on the global classification model). Assume that control device 210-1 determines that the quantification models satisfies a validation threshold (e.g., has an accuracy that exceeds the validation threshold). As shown by reference number 530, control device 210-1 provides the quantification models to control device 210-2 (e.g., for utilization when performing a quantification on spectroscopic measurements performed by spectrometer 220-2) and to control device 210-3 (e.g., for utilization when performing a quantification on spectroscopic measurements performed by spectrometer 220-3).

As indicated above, FIG. 5 is provided merely as an example. Other examples are possible and may differ from what was described with regard to FIG. 5.

In this way, control device 210 facilitates generation of a quantification model based on a selected classification technique (e.g., selected based on model transferability, large-scale quantification accuracy, and/or the like) and distribution of the quantification model for utilization by one or more other control devices 210 associated with one or more spectrometers 220.

Figure 6:
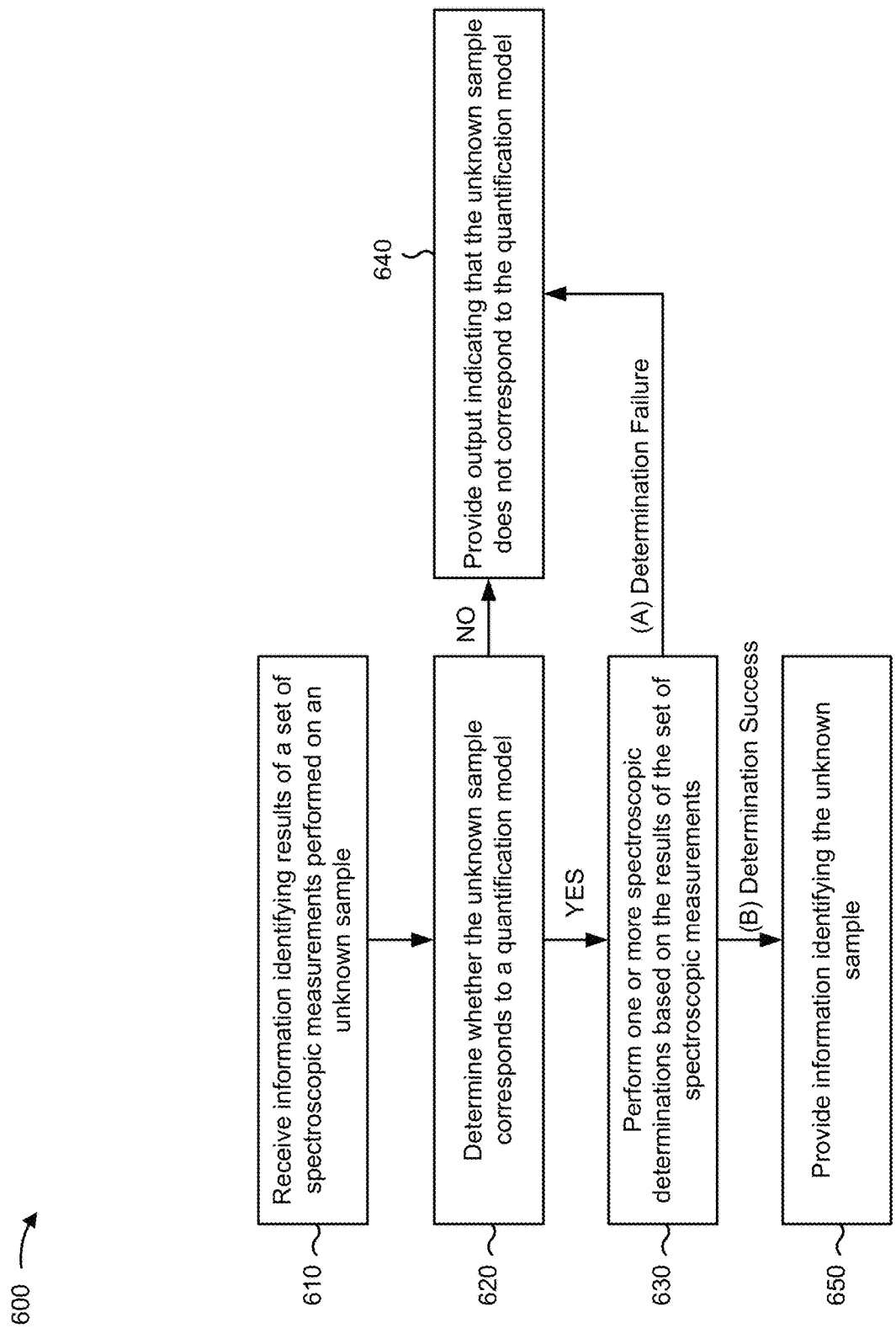
FIG. 6 is a flow chart of an example process for avoidance of false positive identification during spectroscopic quantification.

FIG. 6 is a flow chart of an example process 600 for avoidance of false positive identification during raw material quantification. In some implementations, one or more process blocks of FIG. 6 may be performed by control device 210. In some implementations, one or more process blocks of FIG. 6 may be performed by another device or a group of devices separate from or including control device 210, such as spectrometer 220.

As shown in FIG. 6, process 600 may include receiving information identifying results of a set of spectroscopic measurements performed on an unknown sample (block 610). For example, control device 210 may receive (e.g., using processor 320, communication interface 370, and/or the like) the information identifying the results of the set of NIR spectroscopic measurements performed on the unknown sample. In some implementations, control device 210 may receive information identifying results of a set of spectroscopic measurements on an unknown set (e.g., of multiple samples). The unknown set may include a set of samples (e.g., unknown samples) for which a determination (e.g., a spectroscopic quantification) is to be performed. For example, control device 210 may cause spectrometer 220 to perform the set of spectroscopic measurements on the set of unknown samples, and may receive information identifying a set of spectra corresponding to the set of unknown samples.

In some implementations, control device 210 may receive the information identifying the results from multiple spectrometers 220. For example, control device 210 may cause multiple spectrometers 220 to perform the set of spectroscopic measurements on the unknown set (e.g., the same set of samples), and may receive information identifying a set of spectra corresponding to samples of the unknown set. Additionally, or alternatively, control device 210 may receive information identifying results of a set of spectroscopic measurements performed at multiple times, in multiple locations, and/or the like, and may quantify a particular sample based on the set of spectroscopic measurements performed at the multiple times, in the multiple locations, and/or the like (e.g., based on averaging the set of spectroscopic measurements or based on another technique). In this way, control device 210 may account for physical conditions that may affect results of the set of spectroscopic measurements.

Additionally, or alternatively, control device 210 may cause a first spectrometer 220 to perform a first portion of the set of spectroscopic measurements on a first portion of the unknown set and may cause a second spectrometer 220 to perform a second portion of the set of spectroscopic measurements on a second portion of the unknown set. In this way, control device 210 may reduce a quantity of time to perform the set of spectroscopic measurements relative to causing all the spectroscopic measurements to be performed by a single spectrometer 220.

In this way, control device 210 receives the information identifying the results of the set of spectroscopic measurements performed on the unknown sample.

As further shown in FIG. 6, process 600 may include determining whether the unknown sample corresponds to a quantification model (block 620). For example, control device 210 may attempt to determine (e.g., using processor 320, memory 330, storage component 340, and/or the like) whether the unknown sample is a material for which the quantification model is configured to quantify and/or includes a component, in the material, for which the quantification model is configured to quantify.

In some implementations, control device 210 may use an SC-SVM classifier technique to determine whether an unknown spectrum corresponds to the quantification model. For example, control device 210 may determine a configurable parameter value, nu, for using the SC-SVM technique. The parameter value may correspond to a ratio of training set samples that are determined to be within a decision boundary for the SC-SVM technique to training set samples that are determined to not be within the decision boundary. In some implementations, control device 210 may determine the decision boundary based on the parameter value. In some implementations, control device 210 may use a cross-validation procedure to set multiple possible decision boundaries, and may combine results of using the multiple possible decision boundaries (e.g., via averaging) to determine whether the unknown spectrum corresponds to the quantification model.

In some implementations, based on setting a decision boundary to satisfy the parameter value (e.g., for a parameter value of 0.5, setting the decision value such that half of measurements of the training set are located within the decision boundary and half of measurements of the training set are located outside the decision boundary), control device 210 may determine a decision value, which may correspond to a distance metric from a measurement to the decision boundary. For example, control device 210 may determine a location on a set of axes for the spectrum of the unknown sample, and may determine a distance between the location and a nearest point of the decision boundary. Although some implementations, described herein, are described in terms of a graph or a set of axes, implementations described herein may be determined without use of a graph or the set of axes, such as using another representation of data relating to the unknown spectrum.

In some implementations, control device 210 may determine a decision value for the unknown spectrum. For example, control device 210 may determine a distance from the unknown spectrum to the decision boundary. In some implementations, control device 210 may determine decision values for other measurements located outside the decision boundary. In this case, control device 210 may determine a statistical metric to represent a quantity of standard deviations of the decision value of the unknown spectrum relative to decision values for other measurements outside the decision boundary. For example, control device 210 may determine a log-normal standard deviation based on a log-normal distribution, and may determine whether the standard deviation satisfies a threshold (e.g., 1 standard deviation, 2 standard deviations, 3 standard deviations, etc.). In this case, based on the measurement of the spectrum of the unknown sample being greater than a threshold quantity of standard deviations from the decision boundary (e.g., 3 standard deviations from the decision boundary) relative to other measurements outside the decision boundary, control device 210 may determine that the unknown sample does not correspond to the quantification model (block 620—NO). Alternatively, based on the measurement being less than the threshold quantity standard deviations from the decision boundary, control device 210 may determine that the unknown sample does correspond to the quantification model (block 620—YES). Although described herein in terms of a particular statistical technique and/or a particular threshold quantity of standard deviations, other statistical techniques and/or thresholds may be used.

In this way, control device 210 enables identification of unknown spectra differing from the quantification model by a threshold amount without having the quantification model trained using samples similar to the unknown sample (e.g., also differing from training set samples of the material of interest by the threshold amount). Moreover, control device 210 reduces an amount of samples to be collected for generating the quantification model, thereby reducing cost, time, and computing resource utilization (e.g., processing resources and memory resources) relative to obtaining, storing, and processing other samples for to ensure accurate identification of samples differing from a material of interest and/or concentrations thereof by a threshold amount.

In this way, control device 210 determines whether the unknown sample corresponds to the quantification model.

As further shown in FIG. 6, based on determining that the unknown sample corresponds to the quantification model (block 620—YES) process 600 may include performing one or more spectroscopic determinations based on the results of the set of spectroscopic measurements (block 630). For example, control device 210 may perform (e.g., using processor 320, memory 330, storage component 340, and/or the like) one or more spectroscopic determinations based on the results of the set of spectroscopic measurements. In some implementations, control device 210 may assign the unknown sample to a particular class (e.g., representing a particular concentration of a set of concentrations of a component in a material of interest).

In some implementations, control device 210 may assign the particular sample based on a confidence metric. For example, control device 210 may determine, based on a quantification model, a probability that a particular spectrum is associated with each class of the quantification model (e.g., each candidate concentration). In this case, control device 210 may assign the unknown sample to the class (e.g., a particular concentration) based on a particular probability for the class exceeding other probabilities associated with classes. In this way, control device 210 determines a concentration of a component in a material of interest that the sample is associated with, thereby quantifying the sample.

In some implementations, to perform in-situ local modeling, such as for quantification models with greater than a threshold quantity of classes, control device 210 may generate a local quantification model based on the first determination. The local quantification model may refer to an in-situ quantification model generated using an SVM determination technique (e.g., SVM-rbf, SVM-linear, etc. kernel functions; probability value based SVM, decision value based SVM, etc.; and/or the like) based on confidence metrics associated with the first determination.

In some implementations, control device 210 may generate a local quantification model based on performing the first determination using the global classification model. For example, when control device 210 is being utilized to determine a concentration of a component in an unknown sample, and multiple unknown samples are associated with different quantification models for determining the concentration of the component, control device 210 may utilize the first determination to select a subset of classes as local classes for the unknown sample, and may generate a local quantification model associated with the local classes for the unknown sample. In this way, control device 210 utilizes hierarchical determination and quantification models to improve spectroscopic classification. In this case, control device 210 may determine whether the unknown sample corresponds to the local quantification model based on determining a distance metric for the unknown sample relative to a subset of other measurements of the local quantification model.

As an example, when performing raw material identification to determine a concentration of a particular chemical in a plant material, where the plant material is associated with multiple quantification models (e.g., relating to whether the plant is grown indoors or outdoors, in winter or in summer, and/or the like), control device 210 may perform a set of classification determinations to identify a particular quantification model. In this case, the control device 210 may determine that the plant is grown indoors in winter based on performing a set of determinations, and may select a quantification model relating to the plant being grown indoors in winter for determining the concentration of the particular chemical. Based on selecting the quantification model, control device 210 may determine that the unknown sample corresponds to the quantification model, and may quantify the unknown sample using the quantification model.

In some implementations, control device 210 may fail to quantify the unknown sample using the quantification model. For example, based on one or more decision values or other confidence metrics failing to satisfy a threshold, control device 210 may determine that the unknown sample cannot be accurately quantified using the quantification model (block 630—A). Alternatively, control device 210 may successfully quantify the unknown sample based on one or more decision values or other confidence metrics satisfying a threshold (block 630—B).

In this way, control device 210 performs one or more spectroscopic determinations based on the results of the set of spectroscopic measurements.

As further shown in FIG. 6, based on determining that the unknown sample does not correspond to the quantification model (block 620—NO) or based on a determination failure when performing the one or more spectroscopic determinations (block 630—A), process 600 may include providing output indicating that the unknown sample does not correspond to the quantification model (block 640). For example, control device 210 may provide (e.g., using processor 320, memory 330, storage component 340, communication interface 370, and/or the like) information, such as via a user interface, indicating that the unknown sample does not correspond to the quantification model. In some implementations, control device 210 may provide information associated with identifying the unknown sample. For example, based on attempting to quantify an amount of a particular chemical in a particular plant, and determining that an unknown sample is not of the particular plant (but, instead, of another plant, such as based on human error), control device 210 may provide information identifying the other plant. In some implementations, control device 210 may obtain another quantification model, and may use the other quantification model to identify the unknown sample based on determining that the unknown sample does not correspond to the quantification model.

In this way, control device 210 reduces a likelihood of providing incorrect information based on a false positive identification of the unknown sample, and enables error correction by a technician by providing information to assist in determining that the unknown sample was, for example, of the other plant rather than the particular plant.

In this way, control device 210 provides output indicating that the unknown sample does not correspond to the quantification model.

As further shown in FIG. 6, based on a classification success when performing the one or more spectroscopic determinations (block 630—B), process 600 may include providing information identifying a classification relating to the unknown sample (block 650). For example, control device 210 may provide (e.g., using processor 320, memory 330, storage component 340, communication interface 370, and/or the like) information identifying a quantification relating to the unknown sample. In some implementations, control device 210 may provide information identifying a particular class for the unknown sample. For example, control device 210 may provide information indicating that a particular spectrum associated with the unknown sample is determined to be associated with the particular class corresponding to a particular concentration of a component in a material of interest, thereby identifying the unknown sample.

In some implementations, control device 210 may provide information indicating a confidence metric associated with assigning the unknown sample to the particular class. For example, control device 210 may provide information identifying a probability that the unknown sample is associated with the particular class and/or the like. In this way, control device 210 provides information indicating a likelihood that the particular spectrum was accurately assigned to the particular class.

In some implementations, control device 210 may provide a quantification based on performing a set of classifications. For example, based on identifying a local quantification model relating to a class of the unknown sample, control device 210 may provide information identifying a concentration of a substance in an unknown sample. In some implementations, control device 210 may update the quantification model based on performing a set of quantifications. For example, control device 210 may generate a new quantification model including the unknown sample as a sample of the training set based on determining a quantification of the unknown sample as a particular concentration of a component in a material of interest.

In this way, control device 210 provides information identifying the unknown sample.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
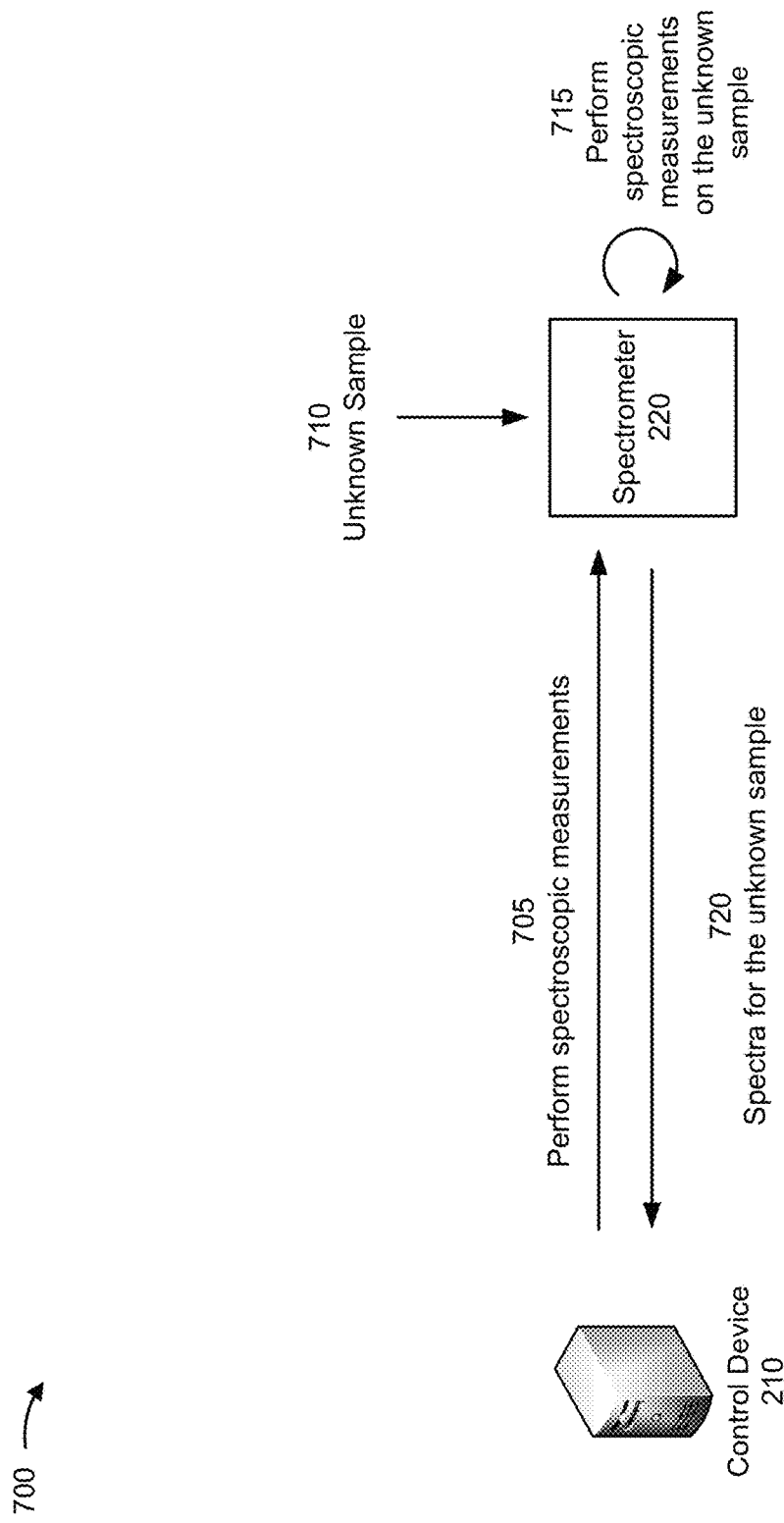
FIGS. 7A and 7B are diagrams of an example implementation relating to the example process shown in FIG. 6.
Figure 7B:
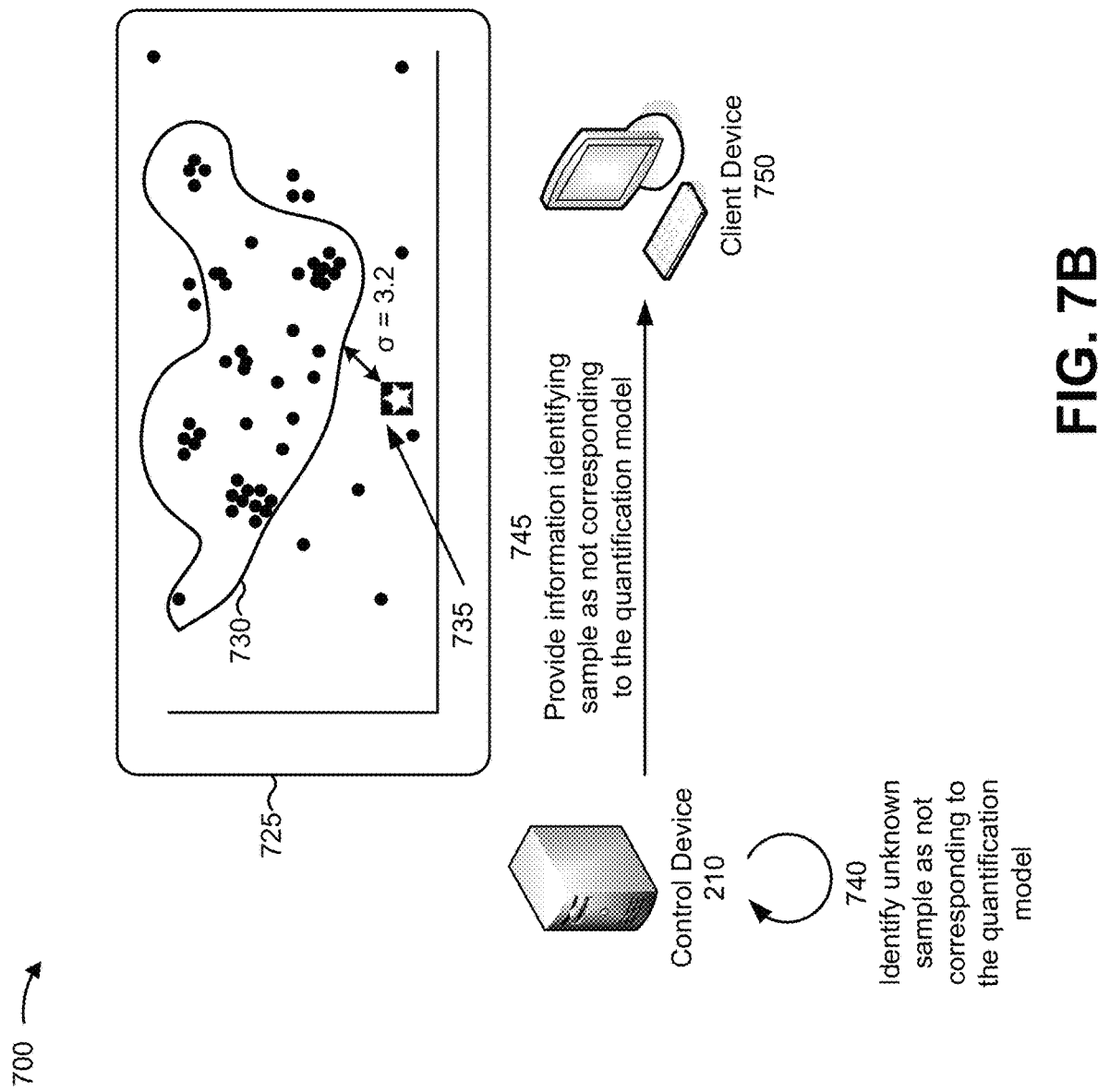

FIGS. 7A and 7B are diagrams of an example implementation 700 relating to prediction success rates associated with example process 600 shown in FIG. 6. FIGS. 7A and 7B show example results of raw material identification using a hierarchical support vector machine (hier-SVM-linear) based technique.

As shown in FIG. 7A, and by reference number 705, control device 210 may cause spectrometer 220 to perform a set of spectroscopic measurements. For example, control device 210 may provide an instruction to cause spectrometer 220 to obtain a spectrum for an unknown sample to determine a concentration of a component in the unknown sample. As shown by reference number 710 and reference number 715, spectrometer 220 may receive the unknown sample and may perform the set of spectroscopic measurements on the unknown sample. As shown by reference number 720, control device 210 may receive spectra for the unknown sample based spectrometer 220 performing the set of spectroscopic measurements on the unknown sample.

As shown in FIG. 7B, control device 210 may use a quantification model 725 to perform spectroscopic quantification. Quantification model 725 includes a single class 730 determined based on a parameter value, nu, such that a decision boundary of the single class 730 results in a threshold ratio of samples of a training set within a decision boundary to samples of the training set not within the decision boundary. In this case, quantification model 725 may be associated with multiple sub-classes corresponding to multiple different concentrations of the component in samples of the training set. As shown by reference numbers 735 and 740, a spectrum of the unknown sample is determined to not correspond to the quantification model based on a standard deviation value (e.g., σ=3.2) for a distance of the sample to the decision boundary satisfying a threshold (e.g., 3). As shown by reference number 745, control device 210 provides output to client device 750 indicating that the unknown sample does not correspond to the quantification model, rather than providing a false positive identification of the unknown sample as a particular concentration of a component in a material of interest.

As indicated above, FIGS. 7A and 7B are provided merely as an example. Other examples are possible and may differ from what was described with regard to FIGS. 7A and 7B.

In this way, control device 210 reduces a likelihood of providing an inaccurate result of spectroscopy based on avoiding a false positive identification of an unknown sample as being a particular concentration of a component in a material of interest for which a quantification model is trained to identify.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
    providing, by a device and to a spectrometer, instructions to perform one or more spectroscopic measurements;
    receiving, by the device and from the spectrometer, sets of spectra based on providing the instructions to perform the one or more spectroscopic measurements;
    training, by the device, a global classification model using a hier-support vector machine (SVM)-linear classifier and a first set of spectra of the sets of spectra;
    verifying, by the device, the global classification model using the hier-SVM-linear classifier and a second set of spectra of the sets of spectra; and
    providing, by the device, multiple quantification models after verifying the global classification model.

2. The method of claim 1, wherein providing the multiple quantification models comprises:
    providing one or more of the multiple quantification models to a first different device associated with a first different spectrometer and to a second different device associated with a second different spectrometer.

3. The method of claim 1, further comprising:
    training and verifying multiple local quantification models associated with the global classification model,
        wherein the multiple local quantification models include one or more of the multiple quantification models.

4. The method of claim 1, wherein the multiple quantification models include:
    a first quantification model corresponding to a first class of the global classification model, and
    a second quantification model corresponding to a second class of the global classification model.

5. The method of claim 1, wherein the multiple quantification models include:
    a first quantification model corresponding to a first class of a local classification model generated based on the global classification model, and
    a second quantification model corresponding to a second class of the local classification model.

6. The method of claim 1, wherein the instructions to perform the one or more spectroscopic measurements comprise instructions to perform the one or more spectroscopic measurements on a training set and a validation set.

7. The method of claim 1, wherein the multiple quantification models include:
    a first quantification model for determining a concentration of a particular protein in a first type of meat identified using in-situ local modeling, and
    a second quantification model for determining the concentration of the particular protein in a second type of meat identified using in-situ local modeling.

8. A device, comprising:
    one or more memories; and
    one or more processors, coupled to the one or more memories, configured to:
        receive, from a spectrometer, sets of spectra associated with one or more spectroscopic measurements;
        train a global classification model using a hier-support vector machine (SVM)-linear classifier and a first set of spectra of the sets of spectra;
        verify the global classification model using the hier-SVM-linear classifier and a second set of spectra of the sets of spectra; and
        provide multiple quantification models after verifying the global classification model.

9. The device of claim 8, wherein the one or more processors, to provide the multiple quantification models, are configured to:
    provide one or more of the multiple quantification models to a first different device associated with a first different spectrometer and to a second different device associated with a second different spectrometer.

10. The device of claim 8, wherein the one or more processors are further configured to:
    train multiple local quantification models associated with the global classification model,
        wherein the multiple local quantification models include one or more of the multiple quantification models.

11. The device of claim 8, wherein the multiple quantification models include:
    a first quantification model corresponding to a first class of the global classification model, and
    a second quantification model corresponding to a second class of the global classification model.

12. The device of claim 8, wherein the multiple quantification models include:
    a first quantification model corresponding to a first class of a local classification model generated based on the global classification model, and
    a second quantification model corresponding to a second class of the local classification model.

13. The device of claim 8, wherein the multiple quantification models include
    a first quantification model for determining a concentration of a particular protein in a first type of meat identified using in-situ local modeling, and
    a second quantification model for determining the concentration of the particular protein in a second type of meat identified using in-situ local modeling.

14. A non-transitory computer-readable medium storing a set of instructions, the set of instructions comprising:
one or more instructions that, when executed by one or more processors of a device, cause the device to:
provide, to a spectrometer, instructions to perform one or more spectroscopic measurements;
receive, from the spectrometer, sets of spectra based on providing the instructions to perform the one or more spectroscopic measurements;
train a global classification model using a first set of spectra of the sets of spectra;
verify the global classification model using a second set of spectra of the sets of spectra; and
provide multiple quantification models after verifying the global classification model.

15. The non-transitory computer-readable medium of claim 14, wherein the one or more instructions, that cause the device to provide the multiple quantification models, cause the device to:
provide one or more of the multiple quantification models to a first different device associated with a first different spectrometer and to a second different device associated with a second different spectrometer.

16. The non-transitory computer-readable medium of claim 14, wherein the one or more instructions further cause the device to:
verify multiple local quantification models associated with the global classification model,
wherein the multiple local quantification models include one or more of the multiple quantification models.

17. The non-transitory computer-readable medium of claim 14, wherein the multiple quantification models include:
a first quantification model corresponding to a first class of the global classification model, and
a second quantification model corresponding to a second class of the global classification model.

18. The non-transitory computer-readable medium of claim 14, wherein the multiple quantification models include:
a first quantification model corresponding to a first class of a local classification model generated based on the global classification model, and
a second quantification model corresponding to a second class of the local classification model.

19. The non-transitory computer-readable medium of claim 14, wherein the instructions to perform the one or more spectroscopic measurements comprise instructions to perform the one or more spectroscopic measurements on a training set and a validation set.

20. The non-transitory computer-readable medium of claim 14, wherein the multiple quantification models include:
a first quantification model for determining a concentration of a particular protein in a first type of meat identified using in-situ local modeling, and
a second quantification model for determining the concentration of the particular protein in a second type of meat identified using in-situ local modeling.

* * * * *